June 15, 1943.    P. S. HAWKINS    2,322,129
ROUTER
Filed Dec. 6, 1939    4 Sheets-Sheet 1

INVENTOR.
Paul S. Hawkins,
BY R. W. Smith
ATTORNEY.

June 15, 1943.    P. S. HAWKINS    2,322,129
ROUTER
Filed Dec. 6, 1939    4 Sheets-Sheet 2

INVENTOR.
Paul S. Hawkins,
BY R. W. Smith
ATTORNEY.

June 15, 1943. P. S. HAWKINS 2,322,129
ROUTER
Filed Dec. 6, 1939 4 Sheets-Sheet 3
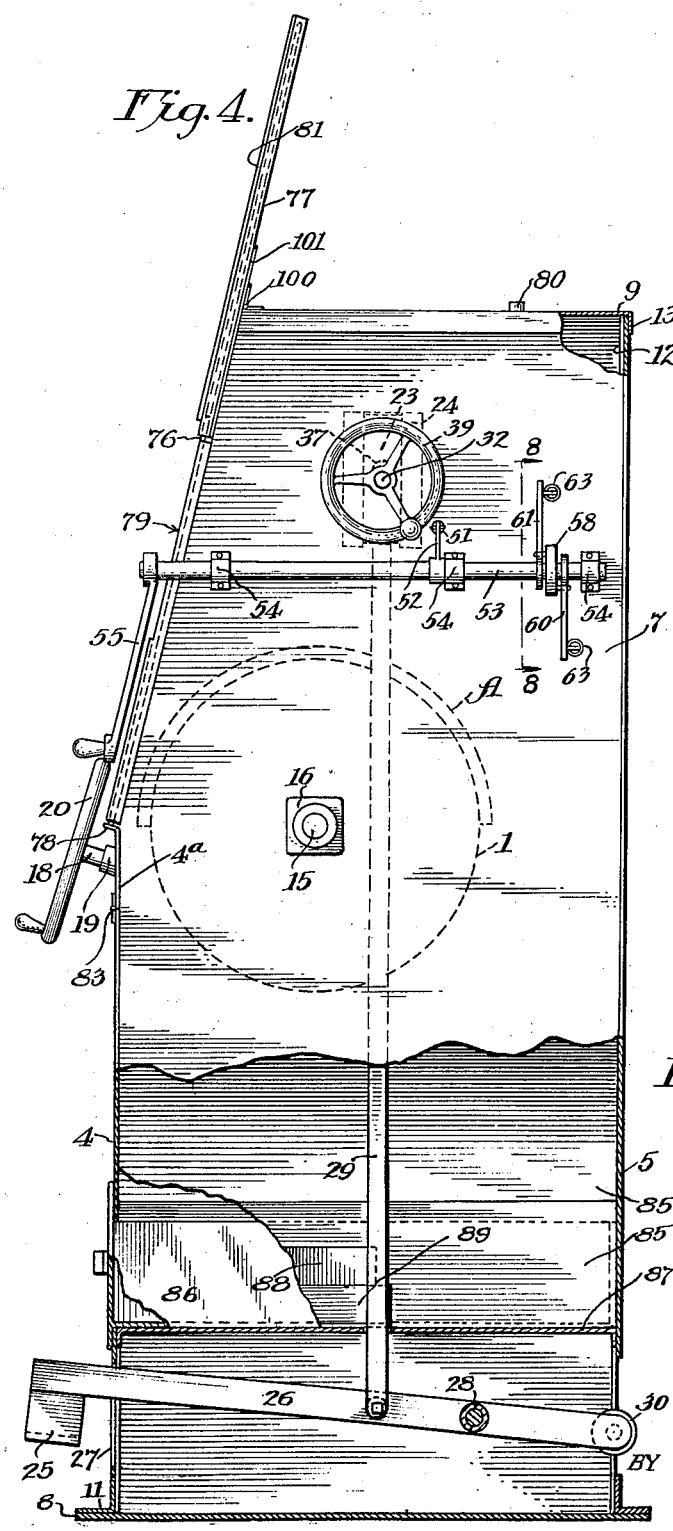
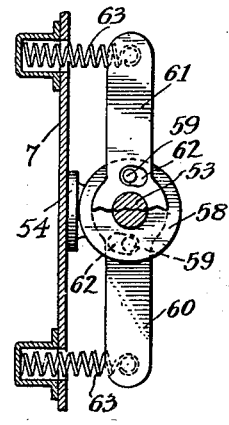
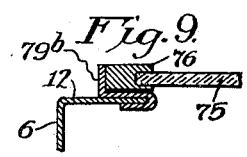
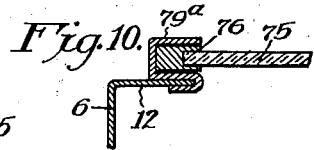
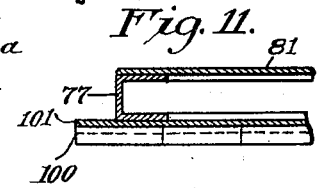
INVENTOR.
Paul S. Hawkins,
BY R. W. Smith
ATTORNEY.

June 15, 1943.　　　　P. S. HAWKINS　　　　2,322,129
ROUTER
Filed Dec. 6, 1939　　　　4 Sheets-Sheet 4
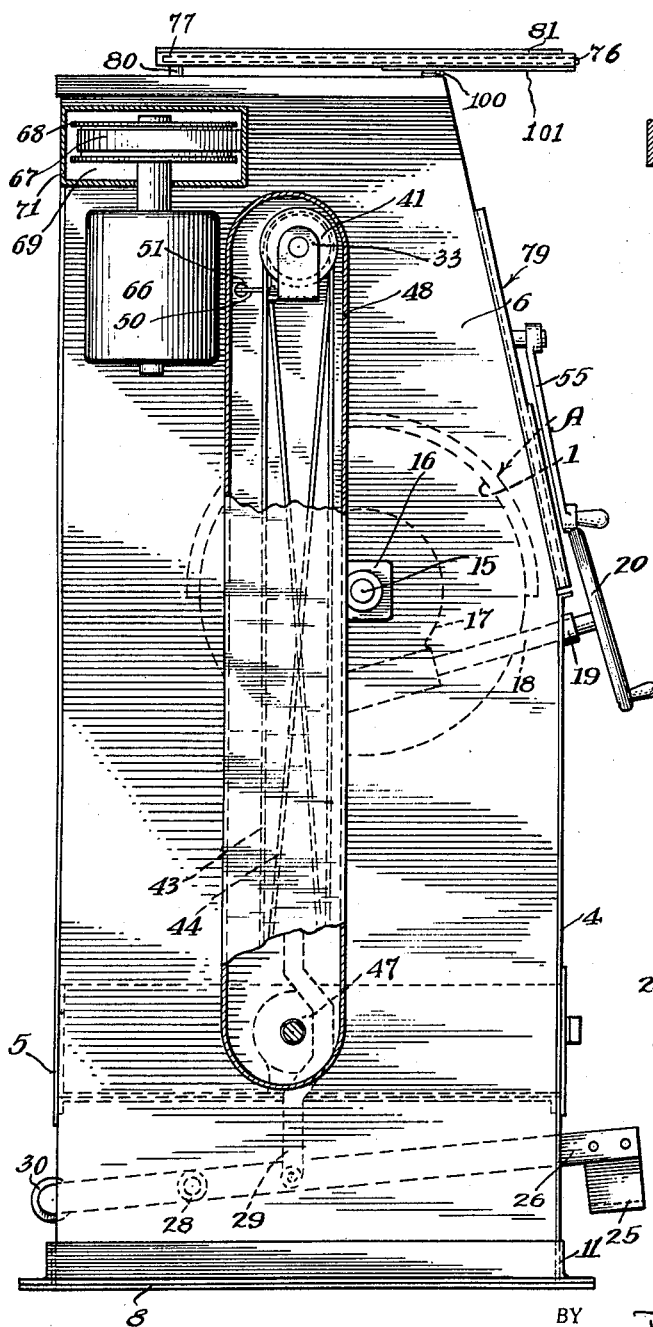
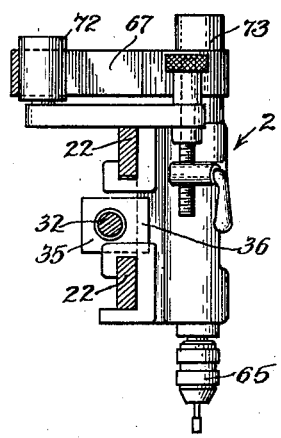
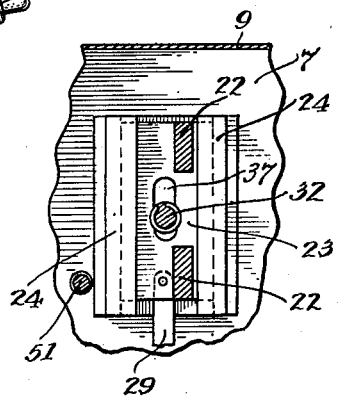
INVENTOR.
Paul S. Hawkins,
BY
ATTORNEY.

Patented June 15, 1943

2,322,129

UNITED STATES PATENT OFFICE 2,322,129

ROUTER

Paul S. Hawkins, Los Angeles, Calif.

Application December 6, 1939, Serial No. 307,821

4 Claims. (Cl. 90—11)

This invention is a router, and is particularly applicable and is therefore described as a router for curved stereotype plates.

It is an object of the invention to enclose the router so that flying chips are confined within the enclosure, with the various controls readily accessible and the work clearly visible from the exterior of the enclosure.

It is a further object of the invention to collect flying chips within the enclosure so that they may be conveniently removed and dumped.

It is a still further object of the invention to readily open the enclosure for removal and replacement of work.

It is another object of the invention to shift the router head perpendicularly, for engaging or disengaging the work with minimum effort and with perpendicular cutting contact.

It is still another object of the invention to selectively manually or power-feed the router head transversely of the work, whereby manual-feed may be employed for short transverse travel, or power-feed may be employed for longer transverse travel.

Figure 1:
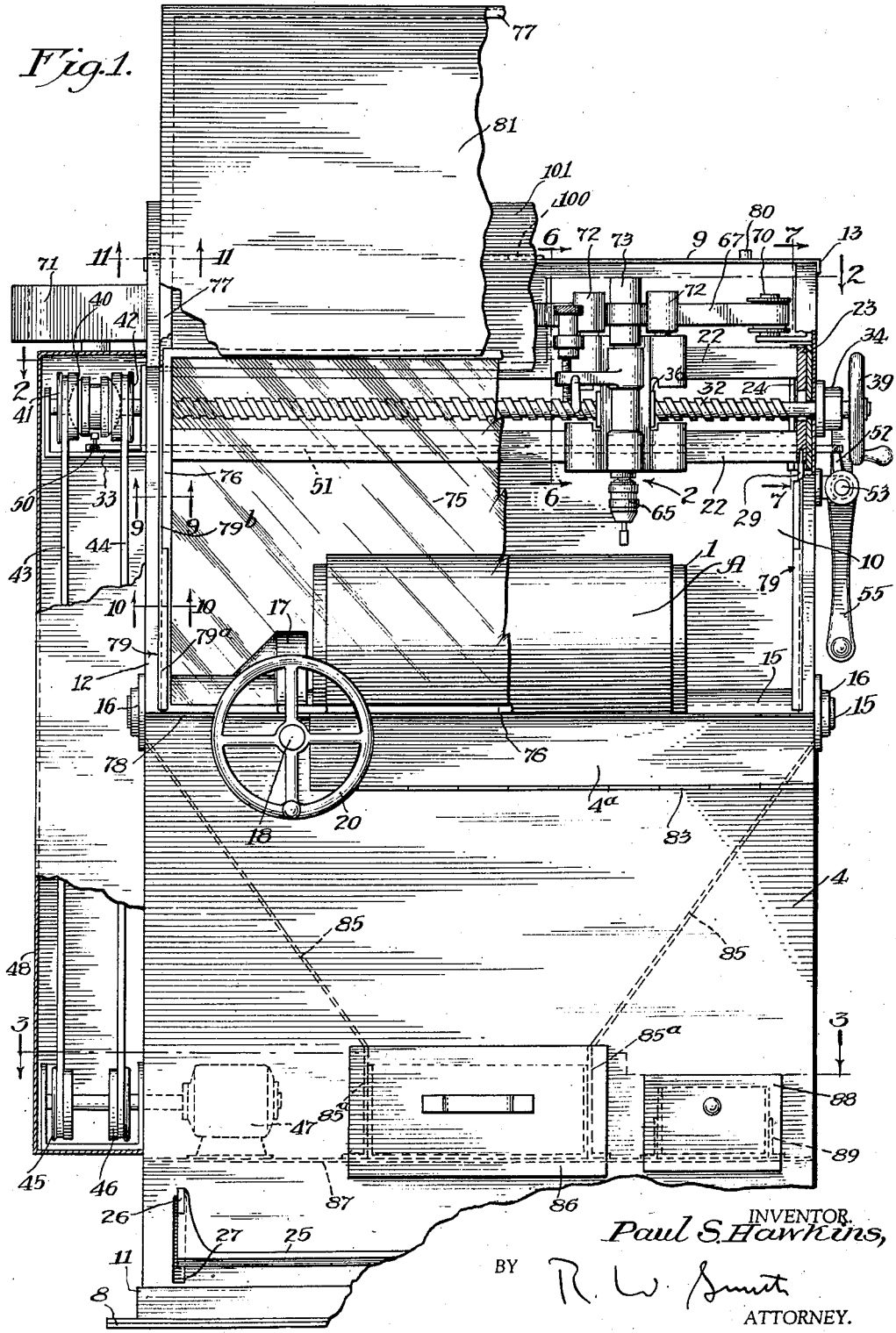

Further objects of the invention will be readily understood from the following description of the accompanying drawings, in which:

Fig. 1 is a front elevation of the router.

Figure 2:
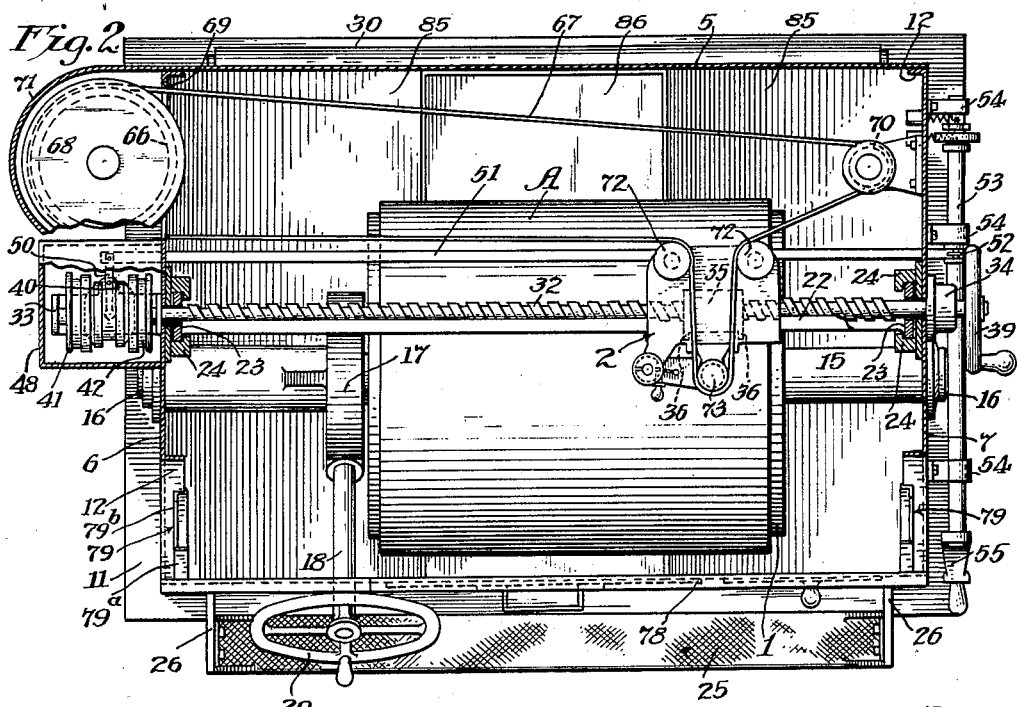
Figure 3:
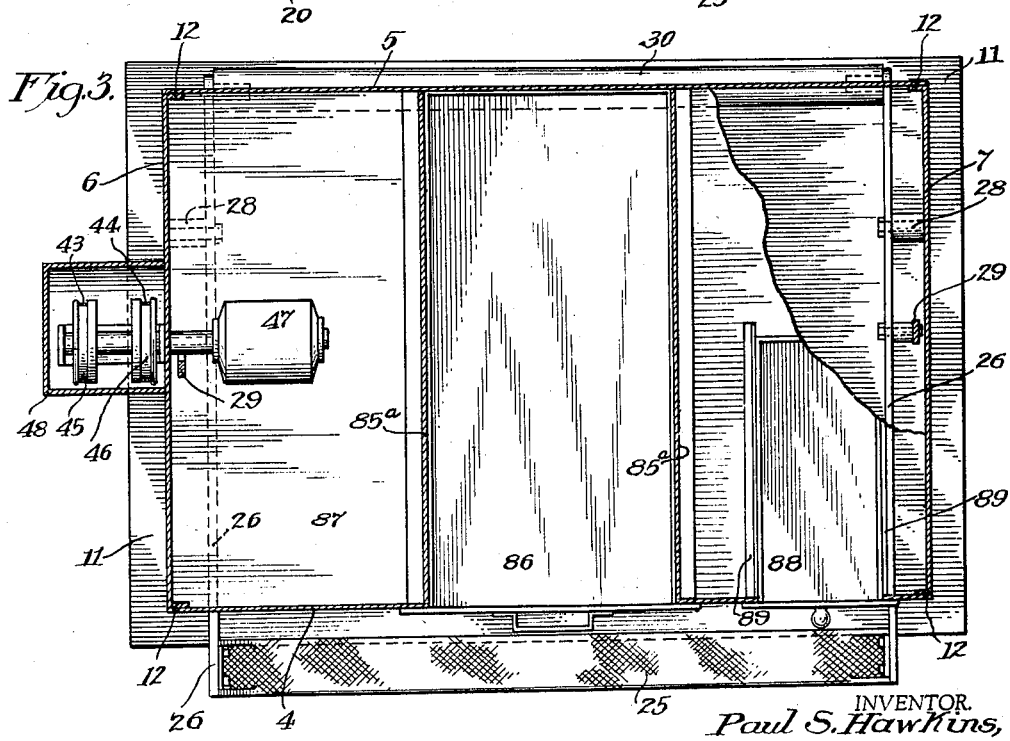

Figs. 2 and 3 are horizontal sections on the lines 2—2 and 3—3 respectively of Fig. 1.

Figs. 4 and 5 are side elevations of the router, viewing the same from its respective ends.

Figs. 6 and 7 are vertical sections on the lines 6—6 and 7—7 respectively of Fig. 1.

Fig. 8 is a vertical section on the line 8—8 of Fig. 4.

Figs. 9, 10 and 11 are detail sections on the lines 9—9, 10—10 and 11—11 respectively of Fig. 1.

The router includes a cylinder 1 and a router head 2 above the cylinder. The cylinder is adapted for oscillatory shifting relative to the router head, with a curved stereotype plate A detachably clamped on the periphery of the shiftable cylinder; and the router head is adapted for shifting longitudinally of the cylinder and relative to the plate A which is mounted thereon.

The cylinder and router head are enclosed for confining flying-chips. As an instance, the supporting frame of the router may comprise front and rear panels 4—5, end panels 6—7, a base 8 and a top panel 9. These panels, when assembled, define a cabinet completely enclosing the cylinder and the router head, except for the upper portion of the front of the cabinet which preferably slopes upwardly and rearwardly and defines an opening 10 for viewing the plate A on the cylinder and through which the stereotype plate may be removed and replaced.

In order that the cabinet may provide a frame of rigidity and strength for adequately supporting the cylinder and the router head, an angle iron 11 may be provided at the junction of the panels 4—5—6—7 with the base 8, the vertical edges of the front and rear panels may overlie angular extensions 12 at the vertical edges of the end panels 6—7, and angular extensions 13 at the rear and side edges of the top panel 9 may overlie the upper edges of the rear and end panels 5—6—7.

The cylinder 1 is journaled in the enclosing cabinet by mounting it upon a shaft 15, the ends of which are journaled in bearings 16 in the end panels 6—7, with the axis of the cylinder at substantially the level of the lower edge of the opening 10. The cylinder 1 is oscillated by a worm drive 17, the housing of which surrounds one end of the shaft 15 within the enclosing cabinet and is supported by the end panel 6. The operating shaft 18 for the worm drive is journaled in a bearing 19 in the front panel 4, and is manually actuated by a hand-wheel 20 at the exterior of the enclosing cabinet.

The router head 2 is slidable along vertically spaced supporting bars 22 which are mounted in the enclosing cabinet above the cylinder 1 and which extend transversely of the cabinet parallel to the axis of the cylinder. The support for the router head is vertically shiftable relative to the cylinder for engaging or disengaging the router with the work, and for this purpose the ends of the supporting bars 22 are connected by plates 23 which are vertically slidable in guideways 24 on the inner surfaces of the end panels 6—7.

The plates 23 are shiftable in their guideways by a pedal 25 at the front of the enclosing cabinet adjacent its base. This pedal is fixed to levers 26 which extend into the enclosing cabinet through slots 27 in the front panel 4 and which are medially pivoted to the end panels 6—7 as shown at 28. Links 29 connect the levers 26 and the vertically slidable plates 23 at the respective ends of the supporting bars 22, with these links slidable on the inner surfaces of the end panels 6—7. The vertically shiftable router head is counterbalanced by a weight 30 which connects the ends of the levers 26 which are remote from the pedal 25.

The router head 2 is slidable along its supporting bars by a lead-screw 32. The lead-screw is mounted between the vertically spaced supporting bars 22 and extends parallel thereto with the ends of the lead-screw shaft journaled in bearings 33—34 at the exterior of the respective end panels 6—7. The lead-screw engages a nut 35 which is associated with the head 2 so that rotation of the lead-screw shifts the router head along its supporting bars in direction determined by the direction of rotation of the lead-screw shaft. To permit vertical shifting of the router head relative to the lead-screw 32 and its cooperating nut 35, the nut straddles the head 2 as shown at 36, for relative vertical shifting of the head and nut, and the ends of the lead-screw shaft extend through slots 37 in the plates 23, for vertical shifting of these plates relative to the lead-screw.

The lead-screw is selectively manually or power-driven. For this purpose, the end of the lead-screw shaft which projects through the end panel 7 is provided with a hand-wheel 39 at the exterior of the enclosing cabinet, thereby adapting lead-screw for hand-feed; and the end of the lead-screw shaft which projects through the end panel 6 is provided with a double clutch 40 for selective power-feed of the lead-screw in either direction.

The double clutch is fixed for rotation with the lead-screw shaft and is shiftable for engaging one or the other of pulleys 41—42, or is shiftable to an intermediate neutral position disengaging both of the pulleys. The pulleys are driven by belt drives 43—44 which engage pulleys 45—46 on the shaft of a motor 47, the belt drive 43 being straight and the belt drive 44 being crossed, for rotating the pulleys 41—42 in opposite directions. The motor 47 is mounted in the lower portion of the enclosing cabinet, with the shaft of the motor projecting through the end panel 6 for alinement of its pulleys 45—46 with the pulleys 41—42. The clutch and the belt drives may be enclosed within a housing 48 which is mounted upon the exterior of the end panel 6.

The clutch 40 is operated by a lever 50 so that power-drive for the lead-screw shaft is inoperative, or for power-drive of the lead-screw shaft in either direction; and the lever 50 is manually controlled, preferably from a point adjacent the hand-wheel 39 whereby the operator may conveniently select hand or power-feed. For this purpose, the lever 50 is actuated by a rod 51 which extends through the enclosing cabinet in rear of the supporting bars 22, with the ends of the rod slidable through the end panels 6—7. One end of the rod 51 is connected to the lever 50 with this connection enclosed by the housing 48, and the opposite end of the rod is connected to a lever 52 of a shaft 53.

The shaft 53 is journaled in bearings 54 at the exterior of the end panel 7, with the shaft below the hand-wheel 39 and projecting forwardly beyond the enclosing cabinet where it is provided with a hand lever 55 for manually rocking the shaft. When the hand lever 55 is in an intermediate, neutral position the rod 51 shifts the clutch 40 to neutral position, thereby rendering the power-feed inoperative and adapting the lead-screw 32 for manual control by the hand-wheel 39; and when the hand lever 55 is selectively shifted in one direction or the other the clutch 40 engages one or the other of the pulleys 41—42 for selective power-drive of the lead-screw in one direction or the other.

Means are preferably provided whereby after shifting the hand lever 55 to either of its power-feed positions, it is automatically returned to intermediate, neutral position upon manual release of the lever. For this purpose, a disc 58 is fixed on the shaft 53, with diametrically opposite studs 59 projecting from the respective faces of the disc. Diametrically opposite arms 60—61 are journaled on the shaft 53, with the studs 59 extending into arcuate slots 62 in the respective arms. The arms 60—61 are spring tensioned as shown at 63, and the arcuate slots 62 are relatively arcuately offset to provide lost-motion operating connections between the shaft 53 and the respective arms 60—61 when the hand lever 55 is shifted in respective opposite directions.

By this arrangement, shifting the hand lever 55 in one direction rocks the arm 60 through its stud and slot connection 59—62 and thereby tensions its spring 63, while the arm 61, as a result of lost motion at its stud and slot connection 59—62, remains in its original position. As soon as the hand lever 55 is released the tensioned spring of the arm 60 rocks this arm in the reverse direction so that the arm, through its stud and slot connection 59—62, returns the shaft 53 and its hand lever 55 to neutral position. In similar manner, shifting the hand lever 55 in the opposite direction tensions the spring of the arm 61, while the arm 60 remains in its original position, so that when the hand lever is released the tensioned spring of the arm 61 returns the shaft 53 and its hand lever to neutral position.

The spindle 65 of the router head is in the plane of the vertical diameter of the cylinder 1 for perpendicular contact with the work when the router head is vertically lowered into operative position; and the spindle is driven by a motor 66 through a belt drive 67. The motor 66 is mounted at the exterior of the end panel 6, with a pulley 68 for the belt drive 67 fixed to the motor shaft and projecting into the enclosing cabinet through an aperture 69 in the end panel 6, and with the opposite end of the belt drive 67 extending around a pulley 70 which is mounted in the enclosing cabinet adjacent the end panel 7. The portion of the pulley 68 which is at the exterior of the enclosing cabinet is enclosed in a housing 71 which is mounted on the exterior of the end panel 6 and which completely encloses the aperture 69.

That portion of the belt drive 67 which is between the pulleys 68—70 engages idler pulleys 72 and a spindle pulley 73 of the router head 2; and these pulleys 72—73 have belt-engaging surfaces of greater width than the belt 67, in order to maintain engagement with the belt throughout vertical shifting of the router head relative thereto.

The opening 10 in the upper portion of the front of the enclosing cabinet is provided with a displaceable closure through which (when closed) the work may be viewed while confining flying chips within the enclosure, and which (when open) permits removal and replacement of the work via the opening 10. For this purpose, the closure is a transparent plate 75, preferably of glass, mounted in a sash 76 and adapted to completely overlie and close the opening 10 or adapted for sliding-tilting movement to a position overlying the top of the enclosing cabinet and clearing the opening 10.

As an instance of this arrangement, the sash of the closure plate is slidably mounted in a channel-frame 77, and the channel-frame is mounted on a plate 101 which is hinged to the forward edge of the top panel 9 of the enclosing cabinet as shown at 100. When the channel-frame 77 is tilted to the position shown at Figs. 1 and 4, the sash 76 is adapted to be drawn downwardly from the channel-frame so as to overlie and close the opening 10, in which position the lower portion of the sash rests upon a lip 78 which is provided at the upper edge of the front panel 4, and the side portions of the sash are received in guides 79 which are provided at the side edges of the opening 10. The upper portion of the sash remains in the channel-frame 77.

When the closure plate is to be displaced for access to the enclosing cabinet via the opening 10, the sash 76 is first shifted upwardly in the guides 79, and the sash and its channel-frame 77 are then tilted rearwardly and the sash is then completely retracted within the channel-frame as shown at Fig. 5, with the channel-frame resting upon resilient bumpers 80 which project upwardly from the top panel 9.

To permit this movement, the lower portions 79a of the guides 79 are channeled in cross-section for sliding reception of the sash 76, while the upper portions 79b of these guides are angular in cross-section for tilting reception or displacement of the sash relative to these angular portions of the guides. When the closure plate, being in operative position, is then shifted upwardly into the frame 77 until it just clears the channel-guides 79a, it counterbalances subsequent tilting of the frame 77 to the position shown at Fig. 5, whereupon the closure plate may be retracted the rest of the way into the frame 77; and when the closure plate, being in inoperative position, is then partially withdrawn from the frame 77 it counterbalances subsequent tilting of the frame to the position shown at Fig. 4, whereupon the sash of the partially withdrawn closure plate which has thus been swung into the angular-guides 79b, may be drawn downwardly the rest of the way along these angular-guides and into the channel-guides 79a.

A panel 81 may overlie the channel-frame 77, so that when the transparent plate 75 is in closed position with the channel-frame tilted upwardly as shown at Fig. 1, the panel 81 forms a support for the copy which is to be followed while routing out the plate A which is mounted on the cylinder 1.

When the closure plate 75 is open, the work is readily removable and replaceable via the opening 10. In order to increase accessibility to the plate A for releasing its clamping engagement with the cylinder 1, that portion of the front panel 4 which is directly in front of the cylinder 1, below its axis preferably forms a door 4a, hinged as shown at 83. The door is closed when the plate 75 is closed, thereby completely enclosing the cylinder and the router head; but when the closure plate has been opened the door 4a may be swung outwardly and downwardly, so that the door 4a, as well as the closure plate 75, is clear of the lower edge of the opening 10, with the opening which is formed by opening the door constituting an extension of the main opening 10.

When the plate 75 and the door 4a are closed, flying chips are confined within the enclosing cabinet; and these chips are collected in the lower portion of the enclosing cabinet so that they may be removed and dumped. For this purpose the portion of the enclosing cabinet which is below the cylinder 1 forms a hopper, the front and rear walls of which are defined by the front and rear panels 4—5 and the side walls of which are defined by walls 85 which slope downwardly and inwardly from the end panels 6—7 as shown at Fig. 1. At their lower ends the walls 85 terminate in depending vertical extensions 85a, thereby defining a mouth for the hopper extending from front to rear of the enclosing cabinet. A drawer 86 is adapted for snug reception in the mouth of the hopper for collecting the chips; and the drawer is slidable for withdrawal via an opening in the front panel 4, for dumping the collected chips.

The drawer 86 may be slidably mounted on a horizontal partition 87 which is provided in the enclosing cabinet at the lower end of the vertical extensions 85a. The motor 47 may be mounted on the partition 87 in the space between the end panel 6 and the proximate side of the hopper 85—85a; and a tool drawer 88 may be mounted on the partition 87 in the space between the opposite side of the hopper and the end panel 7. The drawer 88 is slidable in guideways 89 on the partition 87, and may be withdrawn for access to the drawer, via an opening in the front panel 4.

I claim:

1. In a router, a work support, a router head, a cabinet enclosing the work support and the router head and having an opening for viewing and for removal and replacement of work, a frame tiltably mounted on the cabinet for positioning in the plane of the opening or for clearing said opening, and a transparent closure slidably mounted relative to the frame for projection therefrom for overlying the opening when the frame is in the plane of the opening or for retraction relative to the frame when the latter is clear of the opening.

2. In a router, a work support, a router head above the work support, a cabinet enclosing the work support and the router head and having an opening for viewing and for removal and replacement of work, the opening comprising a main portion and an extension at the lower edge of said main portion, the main portion of the opening being in front of the router head and the upper portion of the work support, and the extension of the opening being in front of the lower portion of the work support, a transparent closure, means for movably mounting the closure on the cabinet above the lower edge of the main portion of the opening, for movement of the transparent closure toward the lower edge of the main portion of the opening for closing said main portion of the opening, or for movement of the transparent closure away from the lower edge of the main portion of the opening for opening said main portion of the opening, a second closure, means for movably mounting the second closure on the cabinet below the lower edge of the main portion of the opening, for movement of the second closure toward the lower edge of the main portion of the opening for closing the extension of the opening, or for movement of the second closure away from the lower edge of the main portion of the opening for opening the extension of the opening.

3. In a router, a work support, a router head above the work support, a cabinet enclosing the work support and the router head and having an opening for viewing and for removal and replacement of work, the opening comprising a main portion and an extension at the lower edge of said main portion, the main portion of the opening being in front of the router head and the upper portion of the work support, and the extension of the opening being in front of the lower portion of the work support, a transparent closure, means for slidably mounting the transparent closure on the cabinet above the lower edge of the main portion of the opening, for movement of the transparent closure toward the lower edge of the main portion of the opening for closing said main portion of the opening, or for movement of the transparent closure away from the lower edge of the main portion of the opening for opening said main portion of the opening, a second closure, means for movably mounting the second closure on the cabinet below the lower edge of the main portion of the opening, for movement of the second closure toward the lower edge of the main portion of the opening for closing the extension of the opening, or for movement of the second closure away from the lower edge of the main portion of the opening for opening the extension of the opening.

4. In a router, a work support, a router head above the work support, a cabinet enclosing the work support and the router head and having an opening for viewing and for removal and replacement of work, the opening comprising a main portion and an extension at the lower edge of said main portion, the main portion of the opening being in front of the router head and the upper portion of the work support, and the extension of the opening being in front of the lower portion of the work support, a transparent closure, means for tiltably mounting the transparent closure on the cabinet at the upper edge of the main portion of the opening, for movement of the transparent closure toward the lower edge of the main portion of the opening for closing said main portion of the opening, or for movement of the transparent closure away from the lower edge of the main portion of the opening for opening said main portion of the opening, a second closure, means for movably mounting the second closure on the cabinet below the lower edge of the main portion of the opening, for movement of the second closure toward the lower edge of the main portion of the opening for closing the extension of the opening, or for movement of the second closure away from the lower edge of the main portion of the opening for opening the extension of the opening.

PAUL S. HAWKINS.